April 14, 1931.  H. M. THORNTON  1,801,061
CINEMATOGRAPH SPOOL CASE
Filed Jan. 12, 1927
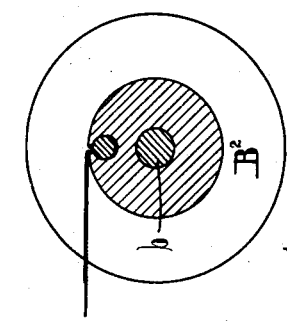
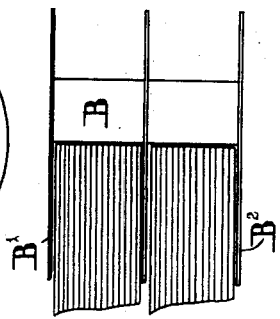
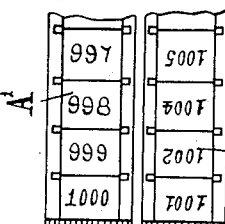
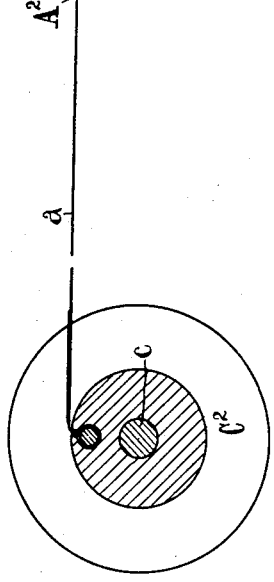
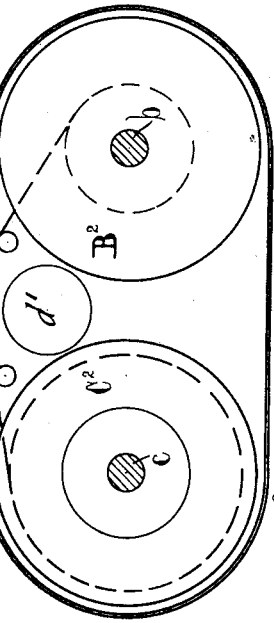
INVENTOR.
H. M. Thornton Patented Apr. 14, 1931

1,801,061

UNITED STATES PATENT OFFICE

HAROLD MELLOR THORNTON, OF WEST HAMPSTEAD, LONDON, ENGLAND

CINEMATOGRAPH SPOOL CASE

Application filed January 12, 1927, Serial No. 160,730, and in Great Britain January 22, 1926.

This invention relates to film apparatus for projecting cinematograph motion-picture films or ribbons of film having still-pictures of lantern-slide type.

Its object is to dispense with the necessity for the operator having to re-wind the film after each exhibit before it can be exhibited again, by adopting two ordinary films placed side by side but one film being reversed in relation to the other, the first film being exhibited by winding the film through the projecting apparatus the films being then removed from the projecting apparatus, inverted, and replaced in the apparatus so that the end of the first film and the start of the second film are at the starting end, the films being again wound through the apparatus to exhibit the second film, both films being on the original spool at the end of the exhibition of the second film.

The invention is illustrated in the accompanying drawings in which:—

Fig. 1 is a side view of spool and reel with the two films thereon.

Fig. 2 is a plan view of same.

Fig. 3 is a side view showing a case carrying the spool, reel and films.

Fig. 4 is a plan view of same.

The film is divided into two sections, $A^1$, $A^2$, which may be of equal length where the nature of the subject will permit, and where it does not the film may be divided at some convenient point representing the end of a chapter, episode, or subject, and when these two sections are not of equal length they are made of equal length by joining extension blanks at one or both ends of the short length until it is equal to the longer length. Or two separate films of two different subjects may be used instead.

To each end of each film $A^1$—$A^2$ is attached a blank length of film, or of transparent paper, or of opaque paper, or other suitable material, forming a leader-strip $a$ which can be given one or two turns round the spools B after fastening the ends of the strip thereto.

On the blank leader-strips $a$ may be printed any suitable wording, such as the name of subject, or instruction notices warning the operator of the approaching end of film, or instructions as to rewinding.

The apparatus is provided with a single spool $B^1$, $B^2$ and a single reel $C^1$, $C^2$ with a divisional flange intermediate of each mounted respectively on spindles $b$, $c$.

One film $A^1$ is attached to and winds on one half spool $B^1$ and corresponding half reel $C^1$ and the other film $A^2$ is attached to and winds on the other half spool $B^2$ and corresponding half reel $C^2$.

The spools $B^1$ $B^2$, reels $C^1$ $C^2$ and films $A^1$ and $A^2$ are preferably carried in an enclosed spool case D which can be inserted in the projecting apparatus without the necessity of removing the spools, reels and films from the case. The spoolcase D is formed with an aperture $d$ in its upper surface through which the films $A^1$, $A^2$ are exhibited and with an aperture $d^1$ in each side wall to allow for the insertion of the illuminating lamp of the projector.

The pictures on the two films are arranged in the usual sequence (that is both films are alike and the usual standard film), but the film $A^2$ is reversed in relation to the film $A^1$ i. e. the start of film $A^1$ is at one end and the start of film $A^2$ at the other.

To exhibit the complete double set of pictures the spool case D is inserted into the projecting apparatus so that film $A^1$ will pass between the projecting lens and illuminating device which enters the case D through one of the apertures $d'$ and the two films are wound off the spools $B^1$, $B^2$ on to the reels $C^1$, $C^2$ the film $A^1$ passing the exposure aperture in the way usual with existing single film apparatus of the ordinary type.

When the first film $A^1$ has passed completely through, the spoolcase D is removed, inverted, and replaced, this operation being readily feasible as the spools, reels, and films are all mounted in the spoolcase D. This inverting of the spoolcase brings film $A^2$ into position for exhibiting with the start of film $A^2$ in the same position as the start of film $A^1$ was originally.

The films are then again wound through the projecting apparatus so that the second film $A^2$ is exhibited. The exhibiting of film $A^2$ winds the films from reels $C^1$, $C^2$ on to which they have been wound by the exhibiting of film $A^1$ back on to the spools $B^1$ $B^2$ so that at the end of the exhibiting of the films they are back upon the same spools as which they started and no rewinding is necessary.

The projector apparatus or spoolcase for use in such projector is provided with either a gate or a rotating drum of double-width to accommodate the two films.

It has already been proposed by various inventors to use single films of double width provided with two separate rows of pictures, with only one spool and reel to operate the complete set, by turning in either direction as required. A disadvantage of that system is that it necessitates the preparation of special negatives and the making of special prints, and of equal length. Should a film break and need cutting and repairing, two sections of pictures are spoiled by break of continuity of subject.

The advantage of this present system is that no special negatives or prints are required, but any standard film print which is an article of commerce in plentiful supply can be used. Also there is not the same limitation of division as in the case of a two-row film, for when using two separate films any desired division can be made. In fact it permits of far greater scope and variation in the editing of a film-subject.

Should one film break and need cutting, the repair can be effected without spoiling the other film, and the difference in length can be made up by adding additional blank at the end of film, though if the blank already there is amply long enough there is no necessity to add any further blank for the two films may be of slightly different length without detriment to the efficient working of the apparatus provided their connections to the spool or reel are adjusted to make both strips the same length between such connections.

I claim:

Film carrying apparatus for cinematograph projectors comprising an apertured casing, two spindles projecting through the casing, a double width three flanged reel mounted on each spindle to rotate therewith, two films of the same length mounted side by side within the casing, the forward end of one film and the reverse end of the second film being attached to one double reel and the reverse end of the first film and the forward end of the second film to the second double reel and guide rollers within the casing over which the films pass, the casing being made symmetrical about a vertical line between the reels whereby it is possible to remove the casing from the projector, invert it end for end and reinsert it therein so that as one film is being exhibited the other film of the pair is being wound upon its second reel ready for exhibition when unwound therefrom.

In testimony whereof I have hereunto set my hand.

HAROLD MELLOR THORNTON.